(12) United States Patent
Aniszczyk et al.

(10) Patent No.: US 9,348,624 B2
(45) Date of Patent: May 24, 2016

(54) MONITORING FILE ACCESS OF JAVA PROCESSES

(75) Inventors: Chris Aniszczyk, Austin, TX (US);
Jennifer E. King, Austin, TX (US);
Christina K. Lauridsen, Austin, TX (US); Robert R. Peterson, Austin, TX (US); Borna Safabakhsh, San Jose, CA (US); Rhys D. Ulerich, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1958 days.

(21) Appl. No.: 12/507,970

(22) Filed: Jul. 23, 2009

(65) Prior Publication Data
US 2011/0023019 A1   Jan. 27, 2011

(51) Int. Cl.
G06F 9/455 (2006.01)
G06F 9/445 (2006.01)
G06F 11/36 (2006.01)

(52) U.S. Cl.
CPC ............ *G06F 9/45504* (2013.01); *G06F 9/445* (2013.01); *G06F 11/3644* (2013.01)

(58) Field of Classification Search
CPC .. G06F 9/45504; G06F 9/445; G06F 11/3644
USPC ........................................................ 717/128
See application file for complete search history.

(56) References Cited

U.S. PATENT DOCUMENTS

| | | |
|---|---|---|
| 5,446,874 A | 8/1995 | Waclawsky et al. |
| 5,867,483 A | 2/1999 | Ennis, Jr. et al. |
| 6,237,143 B1 | 5/2001 | Fontana et al. |
| 6,826,746 B2 | 11/2004 | Evans et al. |
| 7,287,246 B2 | 10/2007 | Tan et al. |
| 7,721,265 B1 | 5/2010 | Xu et al. |
| 8,041,901 B2 | 10/2011 | Snyder |
| 2002/0073398 A1 | 6/2002 | Tinker |
| 2004/0010778 A1 | 1/2004 | Kaler et al. |
| 2004/0054987 A1 | 3/2004 | Sonpar et al. |
| 2005/0216831 A1 | 9/2005 | Guzik et al. |
| 2005/0234909 A1 | 10/2005 | Bade et al. |
| 2005/0278706 A1 | 12/2005 | Garza et al. |
| 2006/0074855 A1 | 4/2006 | Miyamoto et al. |
| 2006/0200807 A1 | 9/2006 | Bates et al. |
| 2007/0038738 A1 | 2/2007 | Iyengar |
| 2007/0113218 A1 | 5/2007 | Nolan et al. |
| 2007/0226172 A1* | 9/2007 | Tajima ............................. 707/1 |

(Continued)

OTHER PUBLICATIONS

U.S. Appl. No. 12/761,390, filed Apr. 15, 2010, Bhogal et al.

(Continued)

*Primary Examiner* — Henry Tsai
*Assistant Examiner* — John Roche
(74) *Attorney, Agent, or Firm* — Yee & Associates, P.C.; Richard Wilhelm

(57) ABSTRACT

A mechanism for monitoring file accesses by a process running in a Virtual Machine. File access information associated with a monitored process selected in a first view in a debugging interface is obtained from a file activity log and displayed as selectable file access events in a second view of the debugging interface, wherein each file access event represents a read or write operation performed on a file at a particular point in time by the monitored process. An initial content of a file associated with the selected file access event and revisions made to the file by the monitored process within a defined period of time is retrieved from the file activity log upon detecting user selection of a file access event in the second view. The revisions are applied to the initial content of the file and displayed in a third view in the debugging interface.

18 Claims, 6 Drawing Sheets

(56) References Cited

U.S. PATENT DOCUMENTS

| | | | |
|---|---|---|---|
| 2007/0244877 A1 | 10/2007 | Kempka | |
| 2007/0250820 A1* | 10/2007 | Edwards et al. | 717/131 |
| 2008/0037435 A1 | 2/2008 | Sankala | |
| 2008/0228854 A1* | 9/2008 | Grimault et al. | 709/201 |
| 2009/0182793 A1* | 7/2009 | Love et al. | 707/206 |
| 2010/0082555 A1* | 4/2010 | Ogawa et al. | 707/688 |
| 2011/0145798 A1 | 6/2011 | Taillefer et al. | |
| 2011/0258613 A1 | 10/2011 | Bhogal et al. | |

OTHER PUBLICATIONS

Valentin et al., "Requirements for Domain Specific Discrete Event Simulation Environments"; Proceedings of the 2005 Winter Simulation Conference, ACM Digital Library, pp. 654-665, 2005.

Wu et al., "Towards Self-Healing Web Services Composition"; ACM Digital Library; Oct. 2009, pp. 1-5.

Nyfeler et al., "Efficient Operation of a Program on a Computer"; ip.com/ibm TDB; p. 1524, Sep. 1, 1987.

Zhang et al., "Mining Individual Performance Indicators in Collaborative Development Using Software"; 2008 15th Asia-Pacific Software Engineering Conference, DIALOG/INSPEC; Dec. 2008.

Office Action, dated Feb. 1, 2013, regarding U.S. Appl. No. 12/761,390, 20 pages.

Novillo et al., "On-Line Debugging and Performance Monitoring with Barriers," Proceedings of the 15th International Parallel and Distributed Processing Symposium, Apr. 2001, 8 pages.

Final Office Action, dated Jul. 8, 2013, regarding U.S. Appl. No. 12/761,390, 20 pages.

* cited by examiner

MONITORING FILE ACCESS OF JAVA PROCESSES

BACKGROUND

1. Field

Embodiments of the disclosure relate generally to an improved data processing system, and in particular to monitoring file accesses by a process running in a Virtual Machine when the process is failing or exhibiting unusual behavior.

2. Background Description

In writing code, runtime analysis of the code is often performed as part of a debugging and optimization process. Runtime analysis is used to understand the behavior of components or modules within the code using data collected during the execution of the code. The analysis of the data collected may provide insight to various potential behaviors and misbehaviors in the code. For example, an understanding of execution paths, code coverage, memory utilization, memory errors, memory leaks in native applications, performance bottlenecks, and threading problems are examples of aspects that may be identified through analyzing the code during execution.

In debugging a system resource, files or folders in a file system may be manually examined to determine if they were either read from or written to prior to the occurrence of an error. Examination of these recently accessed files or folders often allows the programmer to determine the root cause of the error.

SUMMARY

According to one embodiment of the disclosure, a mechanism is provided for monitoring file accesses by a process running in a Virtual Machine when the process is failing or exhibiting unusual behavior. Responsive to detecting selection of a monitored process in a first view in a debugging interface, the file access information associated with the monitored process is obtained from a file activity log. The file access information is displayed as selectable file access events in a second view of the debugging interface, wherein each file access event represents a read or write operation performed on a file at a particular point in time by the monitored process. Responsive to detecting user selection of a file access event in the second view, an initial content of a file associated with the selected file access event is retrieved from the file activity log. Revisions made to the file by the monitored process within a defined period of time are also retrieved from the file activity log. The revisions made to the file within the period of time are applied to the initial content of the file to form revised file content, wherein the revised file content comprises a state of the file at the particular point in time. The revised file content is displayed in a third view in the debugging interface.

DETAILED DESCRIPTION

Figure 1:
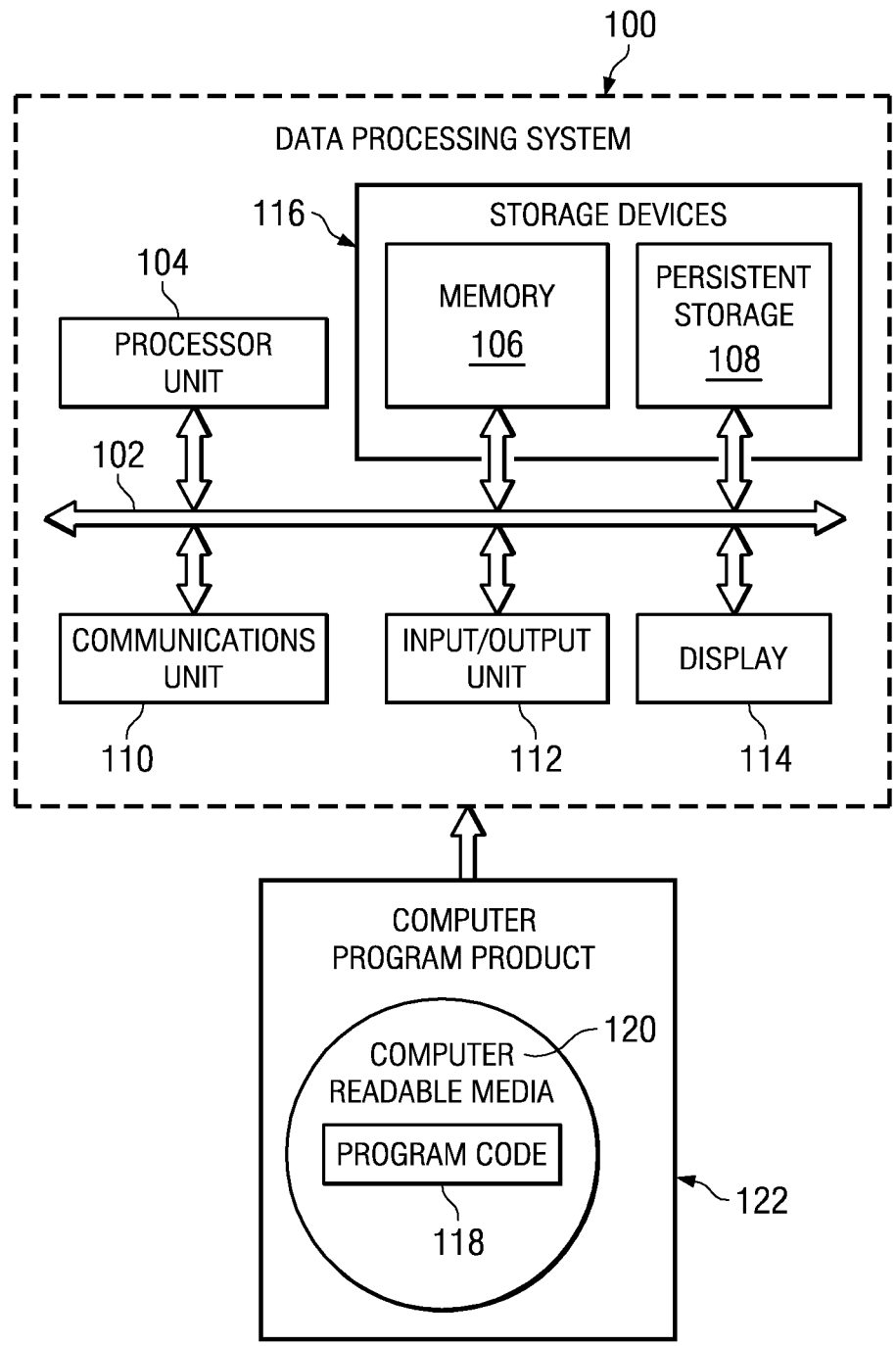
FIG. 1 is a block diagram of a data processing system in which the illustrative embodiments may be implemented.

As will be appreciated by one skilled in the art, aspects of the disclosure may be embodied as a system, method or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems) and computer program products according to embodiments of the disclosure. It will be understood that each block of the flowchart illustrations and/or lock diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The illustrative embodiments provide a mechanism for monitoring and logging resources accessed by a process running in a Virtual Machine when the process is failing or exhibiting unusual behavior. The illustrative embodiments monitor a process to identify the specific resources in a system accessed during execution of the process. A process, or thread, is a basic unit of program execution. A resource may be accessed by a Java process when the process reads or writes to the file or folder. A resource may comprise a file or folder in a file system. The file may be stored locally or on a removable storage media such as an external memory card. The process may access the external memory card via FileConnection Optional Package application programming interfaces (APIs) for Java 2 Micro Edition (J2ME) devices, or via other equivalent packages on virtual machines. In another embodiment, a resource may comprise a database native to the J2ME device, including databases used for address books, calendars, or 'to do' lists. In another embodiment, the process may access the database via Personal Information Management (PIM) Optional Package APIs for J2ME devices, or via other similar packages on virtual machines.

During execution of the process running in a Virtual Machine, the illustrative embodiments collect information about each resource access. The CPU and memory utilization for a resources access at the time is known. The resource access information may include, but is not limited to, the process identifier of the accessing process, the time of modification, and the particular action taken (e.g., read, write). The collected resource access information may then be logged to a file activity log and used to assist in debugging system failures.

To monitor resource accesses by Virtual Machine processes, the illustrative embodiments may employ a resource access specification filter. The resource access specification filter comprises an expression declaring resources in the system that are of interest for monitoring purposes. If no filter is specified, all resources accessed by a process are considered resources of interest. A resource of interest is a resource in which the user/debugger is interested in monitoring, and whose presence or contents affect or are part of the behavior of the application. For example, resources of interest may include, but are not limited to, configuration files, properties files, log/audit files, and the like. Resource access hooks are applied to each resource of interest in the system, without changing the code of a program. A resource access hook is a call back routine that is triggered when a specific event (e.g., a resource access) has occurred. A resource access hook applied to a resource of interest may be triggered in the illustrative embodiments when a process running in a Virtual Machine when the process is failing or exhibiting unusual behavior accesses (e.g., reads or writes to) the resource. When the resource access hook is triggered, the resource access hook fires an 'event' to notify a listener of the occurrence of a resource access event by the process.

Upon launching the Virtual Machine, the resource access hook may consume the resource access specification at startup. As the process accesses resources, the Virtual Machine notifies the resource access hook. For accesses related to specific resources of interest in the system as defined by the resource access specification filter, the resource access hook fires events comprising the resource access information. These events are then received by resource access listener agents that log the collected resource access information in a file or store the information in a Java stack trace. The collected resource access information may be used to augment an exception, therein providing additional information for use in determining the root cause of an exception. An exception typically contains the type of exception (e.g. null pointer exception, class cast exception, run-time exception, etc), possibly any descriptive information available, and the history of execution flow that led up to the error condition. Augmenting an exception includes resource access information correlated to that execution flow history, showing what/when was read/written to at what points in the control flow.

Figure 2:
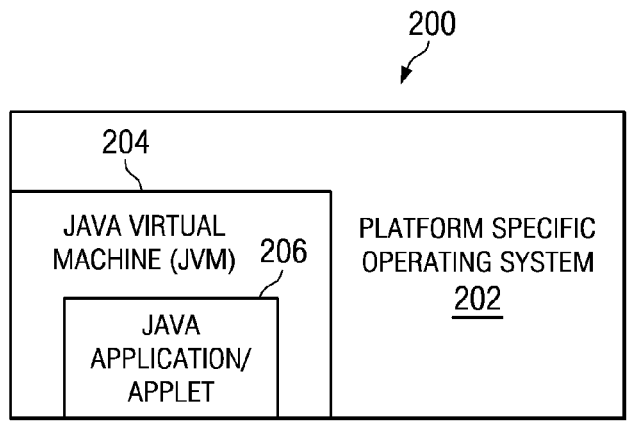
FIG. 2 is a block diagram illustrating the relationship of software components operating within a computer system used to implement aspects of the illustrative embodiments.

Turning next to FIG. 2, a block diagram illustrating the relationship of software components operating within a computer system used to implement aspects of the illustrative embodiments is shown. Java-based system 200 contains platform specific operating system 202 that provides hardware and system support to software executing on a specific hardware platform. Virtual Machine 204 is a software application that may execute in conjunction with the operating system. Virtual Machine 204 provides a Java run-time environment with the ability to execute Java application or applet 206, which is a program, servlet, or software component written in the Java programming language. The computer system in which Virtual Machine 204 operates may be similar to data processing system 100 described in FIG. 1. However, Virtual Machine 204 may be implemented in dedicated hardware on a so-called Java chip, Java-on-silicon, or Java processor with an embedded picoJava core.

At the center of a Java run-time environment is the Virtual Machine, which supports all aspects of Java's environment, including its architecture, security features, mobility across networks and platform independence. The Virtual Machine is a virtual computer, i.e. a computer that is specified abstractly. Certain features are present in every Virtual Machine, with some range of design choices that may depend upon the platform on which the Virtual Machine is designed to execute. For example, all Virtual Machines must execute Java bytecodes and may use a range of techniques to execute the instructions represented by the bytecodes. A Virtual Machine may be implemented completely in software or somewhat in hardware. This flexibility allows different Virtual Machines to be designed for mainframe computers and PDAs.

The Virtual Machine is the name of a virtual computer component that actually executes the programs. Programs are not run directly by the central processor but instead by the Virtual Machine, which is itself a piece of software running on the processor. The Virtual Machine allows programs to be executed on a different platform as opposed to only the one platform for which the code was compiled. Programs are compiled for the Virtual Machine. In this manner, applications for many types of data processing systems may be supported, which may contain a variety of central processing units and operating systems architectures. To enable an application to execute on different types of data processing systems, a compiler typically generates an architecture-neutral file format—the compiled code is executable on many processors, given the presence of the run-time system. The compiler generates bytecode instructions that are nonspecific to a particular computer architecture. A bytecode is a machine independent code generated by the compiler and executed by an interpreter. An interpreter is part of the Virtual Machine that alternately decodes and interprets a bytecode or bytecodes. These bytecode instructions are designed to be easy to interpret on any computer and easily translated on the fly into native machine code. Bytecodes are translated into native code by a just-in-time compiler or JIT.

A Virtual Machine loads class files and executes the bytecodes within them. More specifically, a class loader in the Virtual Machine loads these class files. The class loader loads class files from an application and the class files from the application programming interfaces (APIs), which are needed by the application. The execution engine that executes the bytecodes may vary across platforms and implementations.

When an application is executed on a Virtual Machine that is implemented in software on a platform-specific operating system, an application may interact with the host operating system by invoking native methods. For example, a Java method is written in the Java language, compiled to bytecodes, and stored in class files. A native method is written in some other language and compiled to the native machine code of a particular processor. Native methods are stored in a dynamically linked library whose exact form is platform specific.

Figure 3:
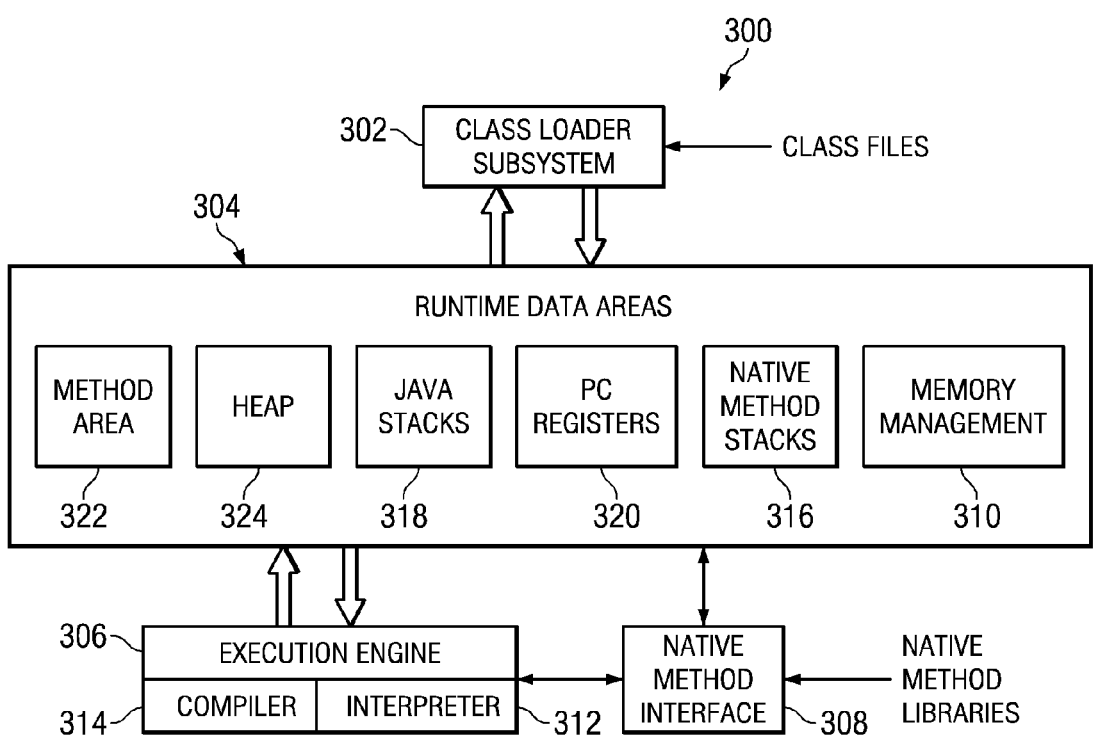
FIG. 3 is a block diagram of a Virtual Machine in accordance with the illustrative embodiments.

FIG. 3 is a block diagram of a Virtual Machine in accordance with the illustrative embodiments. Virtual machine 300 includes class loader subsystem 302, which is a mechanism for loading types, such as classes and interfaces, given fully qualified names. Virtual machine 300 also contains runtime data areas 304, execution engine 306, native method interface 308, and memory management 310. Execution engine 306 is a mechanism for executing instructions contained in the methods of classes loaded by class loader subsystem 302. Execution engine 306 may be, for example, Java interpreter 312 or just-in-time compiler 314. Native method interface 308 allows access to resources in the underlying operating system. Native method interface 308 may be, for example, the Java Native Interface (JNI).

Runtime data areas 304 and memory management 310 contain native method stacks 316, Java stacks 318, PC registers 320, method area 322, and heap 324. These different data areas represent the organization of memory needed by Virtual Machine 300 to execute a program.

Java stacks 318 store the state of Java method invocations. When a new thread is launched, the Java virtual machine creates a new Java stack for the thread. The virtual machine performs only two operations directly on Java stacks: it pushes and pops frames. A Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the virtual machine pushes a new frame onto the Java stack of the thread. When the method completes, the virtual machine pops the frame for that method and discards it. The virtual machine does not have any registers for holding intermediate values; any Java instruction that requires or produces an intermediate value uses the stack for holding the intermediate values. In this manner, the Java instruction set is well-defined for a variety of platform architectures.

Program counter (PC) registers 320 indicate the next instruction to be executed. Each instantiated thread gets its own PC register and Java stack. If the thread is executing a virtual machine method, the value of the PC register indicates the next instruction to execute. If the thread is executing a native method, then the contents of the PC register are undefined.

Native method stacks 316 store the state of invocations of native methods. The state of native method invocations is stored in an implementation-dependent way in native method stacks, registers, or other implementation-dependent memory areas. In some Java virtual machine implementations, native method stacks 316 and Java stacks 318 are combined.

Method area 322 contains class data, while heap 324 contains all instantiated objects. The constant pool is located in method area 322 in these examples. The virtual machine specification strictly defines data types and operations. Most virtual machines choose to have one method area and one heap, each of which are shared by all threads running inside the virtual machine such as Virtual Machine 300. When Virtual Machine 300 loads a class file, it parses information about a type from the binary data contained in the class file. Virtual Machine 300 places this type of information into the method area. Each time a class instance or array is created, the memory for the new object is allocated from heap 324. Virtual Machine 300 includes an instruction that allocates memory space within the memory for heap 324, but includes no instruction for freeing that space within the memory. Memory management 310 in the depicted example manages memory space within the memory allocated to heap 324.

Figure 4:
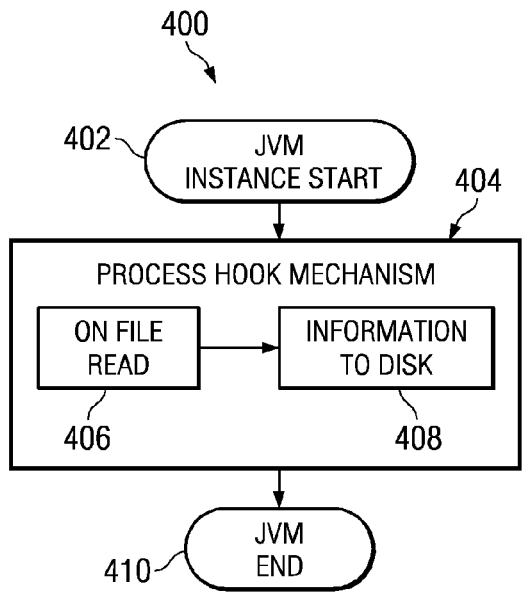
FIG. 4 is a general diagram illustrating components used to implement the filtering aspects of the illustrative embodiments.

FIG. 4 is a general workflow diagram illustrating components used to implement the filtering aspects of the illustrative embodiments. Virtual machine instance in block 402 is an example run-time instance of Virtual Machine 300 in FIG. 3. A virtual machine instance may be initialized when a Java application, such as Java application 206 in FIG. 2, is started. The virtual machine instance is initialized with specific parameters. In this illustrative example, the virtual machine instance is started with parameters which attach process hook mechanism in block 404 to the virtual machine instance.

When the application being debugged is launched, a reference to the desired resource access hook is provided to the Java virtual machine as a parameter. Upon startup, virtual machine instance 402 launches with the file access hook. The resource access hook then consumes the resource access specification, such as, for example, by reading the specification from a configuration file. The resource access specification informs the virtual machine which resource or set of resources are 'of interest' (i.e., resources which should be monitored). In one embodiment, the resource access specification may be implemented similarly to resource tracing methods. For instance, the user may provide a path for a specific resource or specify an entire directory tree (e.g., com.ibm.webservices.fabric.*). The path may be provided as a string and resources may be separated by commas. The virtual machine then loads this information and registers all of these resources to be monitored.

The resource access specification may focus the resource access hook on specific resources of interest depending upon the particular situation. For example, for a particular application on a handheld device, it may make sense to apply a hook to the Websphere Common Configuration Model (WCCM) file-based repository, rather than the operating system files.

Process hook mechanism may comprise a resource access listener which receives the events fired by the resource access hooks and stores the event information. Process hook mechanism also comprises call back routines applied to the system that are triggered when a specific event (e.g., a file access) has occurred. The process hook mechanism is instantiated for each Java virtual machine instance created.

The Java virtual machine is aware of the resource accesses of the Java processes running within the Java virtual machine. Since the Java virtual machine has been configured at start-up to inform the hook when resource accesses occur, the Java virtual machine invokes process hook mechanism when a resource access occurs, such as on resource read in block 406.

As the Java virtual machine informs the process hook mechanism of detected events, the process hook mechanism compares the events to its resource access specification filter. If a resource access event matches the resource access specification filter, the process hook mechanism notifies its listeners. The listeners 'listening' for these events, may be programmed to implement any behavior, such as simply logging it to a file as in block 408, informing the user, or auditing the event to generate a report. The resource access information may comprise one or more of the following: the file name and path of the resource being accessed, the access operation (e.g. read, write, open, close, etc.), the values being read, written, from/to the file, the date/time or the modification, the Java process identifier, among others. The process hook mechanism continues to monitor the Java process until the Java virtual machine instance dies in block 410.

The resource access information may be used to augment an exception, therein providing additional information for use in determining the root cause of an exception. When the resource access listeners receive the resource access information, the resource access information may be logged to disk. The information may be subsequently retrieved for debugging purposes. In an alternative embodiment, the resource access information may be stored as part of a standard Java stack trace. A Java stack trace is a snapshot of the threads (processes) in a Java Virtual Machine and comprises a data log that indicates execution flows for an executing program. The Java stack trace provides information on the execution history of the current thread, displaying the names of the classes and methods within those classes that had been called at the point when an exception occurred. The trace may be used to diagnose Java software problems when an exception has been thrown. The resource access information may also be used to provide meta-data to run-time threads. For instance, an application may be written which listens to its own resource accesses and modifies its behavior based on the accesses. If one thread in such an application modifies a configuration file, another thread may listen to resource accesses on that configuration file and reload its contents to update.

In one embodiment, the process hook mechanism may be implemented as an in-process profiler agent. This profiler agent listens to native Java operations, such as resource accesses. The virtual machine may invoke a profiler agent using the following invocation: java-agentlib:IOProcessHook.so=<options>. The profiler agent may interact with the currently running Java virtual machine using the Java Virtual Machine Profiler Interface (JVMPI). The JVMPI is a two-way function call interface between the Java virtual machine and an in-process profiler agent. The virtual machine uses resource access hooks applied in the system to detect when the process accesses particular resources (i.e., resources of interest). These access hooks may fire "events" comprising the resource access information. The profiler agent listens for particular events corresponding to resource access by the process. The profiler agent logs the resource access information from the events in a file or stores the information in a Java stack trace.

In another embodiment, the process hook mechanism may be implemented with aspect oriented programming to use advices, for example, to perform a certain event when a file read occurs. One example of aspect oriented programming is AspectJ. AspectJ is an aspect-oriented extension to Java and allows one to define aspects. An aspect allows one to implement a concern, and a concern in this case may be every time a Java program accesses a file. Aspect-oriented programming (using advices/concerns) allows a developer to indicate that a certain control flow or piece of code should be executed whenever a certain event happens. In this embodiment, an aspect is developed and instrumented into the profiled application to notify the resource access hook of resource access events. As described, the resource access hook then filters access events based on an optional resource access specification filter, and invokes listeners as appropriate. AspectJ provides a flexible format for defining what events are of interest.

Figure 5:
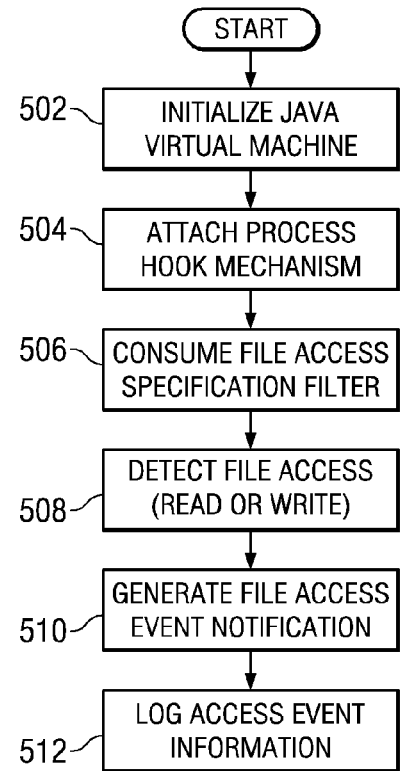
FIG. 5 is a flowchart of a process for monitoring and logging resource accesses of processes running in a Virtual Machine on a resource-constrained device.

FIG. 5 is a flowchart of a process for monitoring and logging resource accesses of processes running in a Virtual Machine. The process described in FIG. 5 may be implemented in a virtual machine such as virtual machine 300 in FIG. 3.

The process begins when an instance of the virtual machine is initialized for a process (step 502). The virtual machine instance may be initialized when an application is started. The virtual machine instance is started with specific parameters which attach the process hook mechanism to the virtual machine instance (step 504). The process hook mechanism may comprise a JVMPI through which profiler agents may receive event notifications triggered from resource access hooks in the files of interest and log the event information. Alternatively, the process hook mechanism may comprise aspect oriented programming which defines specific actions to be taken (e.g., log the event information) in response to receiving an event notification from the resource access hooks.

During the initialization, the process hook mechanism consumes the resource access specification (step 506). The resource access specification defines the resources of interest in the system for monitoring purposes of a particular process or a plurality of processes.

As the process is running in the virtual machine, the process hook mechanism may detect that the process has accessed a resource of interest as defined by the resource access specification (step 508). The process hook mechanism may detect an access using the resource access hooks applied to the resources of interest. When the process accesses a resource, the resource access hook is triggered. The resource access hook then generates a resource access event notification (step 510). The resource access event information may then be logged to a file or stored as part of a standard Java stack trace (step 512). Steps 508 through 512 may loop and repeat as resource accesses occur for the monitored process(es). The resource access event information may be used to assist in debugging system failures, such as by examining the resource accesses made in a period prior to an exception. The resource access event information may also be used to augment an exception, therein providing additional information for use in determining the root cause of the exception.

The illustrative embodiments further provide a file access interface in a debugging facility that enables a user to view the state of an executing process at a point in time when a particular file is accessed by the process. A file access occurs when the process opens, closes, reads, or writes to a file stored in memory. The aspects of the illustrative embodiments may be implemented with existing debugging facilities that describe the states of a process during execution. For example, existing debugging facilities may provide various views to a user that displays states of a process including the line in the program code that is currently being executed, the values of the variables in memory, the particular processes/threads that are running, and a stack trace showing the execution history of the current process/thread. The file access interface aspect in the illustrative embodiments improve upon existing debugging facilities by allowing a user to view file accesses by a process in a timeline structure, wherein the timeline structure also comprises DVR-like rewind and forward capability that enables the user to view, in any order, the content of the files that have been accessed by the executing process. A digital video recorder (DVR) is a device that records video in a digital format to a disk drive or other memory medium within a device. A DVR provides the capability for a user to rewind or forward through a recorded program.

With the file access interface of the illustrative embodiments, as a monitored process is executing, the debugging facility records the file accesses of the monitored process. The debugging facility may record all of the file accesses or a defined subset of the file accesses, depending upon the particular implementation desired. The DVR-like rewind and forward capabilities are achieved in the debugging facility by recording the revision history of accessed files as the monitored process is executing, and compiling the recorded revision history into a viewable format. The revision history view may show both the evolution of the file as its contents changed, as well as the contents of a file at any particular point in time or execution flow.

The first time a file is accessed by the monitored process, the debugging facility takes an initial snapshot of the file's contents. From that point on, the debugging facility listens for and captures any changes of the file by the monitored process and records the changes in a file activity log. A file may be changed by the monitored process being debugged, as well as by other executing processes. The illustrative embodiments may employ any known techniques for listening to file changes, such as by registering with the operating system and polling for changes, or by "diff'ing" file contents for changes by comparing one version of the file to another version.

When viewing the playback of an accessed file, the illustrative embodiments may re-create the contents of the file at any point in time during execution of the monitored process by applying the sequence of changes recorded in the file activity log to the initial file contents. The file contents can intuitively be correlated to a process execution flow and its related debug data, such as stack traces, memory values, etc. This playback of the accessed file may be viewed in real-time to assist in debugging monitored process, or viewed after-the-fact to understand interactions between the monitored process and accessed files.

Figure 6:
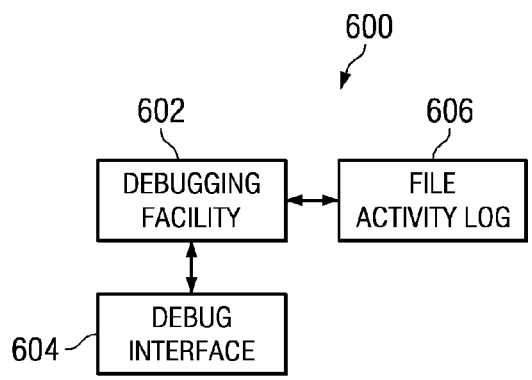
FIG. 6 is a block diagram of components in a data processing system used to implement aspects of the illustrative embodiments.

FIG. 6 is a block diagram of components in a data processing system used to implement aspects of the illustrative embodiments. Data processing system 600 comprises a debugging facility 602, debug interface 604, and file activity log 606. Debugging facility 602 may comprise a Java program that runs in a virtual machine, such as virtual machine 300 in FIG. 3. Debugging facility 602 may test and debug other programs by running a program step by step, stopping (breaking) the program to examine the current state, and tracking the values of some variables. Debug interface 604 allows users to control and observe a program as it executes. Debug interface 604 provides the ability to suspend and resume threads, and to set breakpoints, watchpoints, and inspect a suspended threads state, local variables, stack backtrace, etc. File activity log 606 comprises resource access information that is logged in memory during execution of the process running in a virtual machine. When the process is running, the illustrative embodiments collect information about each resource access, including the process identifier of the accessing process, the time of modification, and the particular action taken (e.g., read, write). The collected resource access information is logged to file activity log 606 to assist in debugging system failures.

Figure 7:
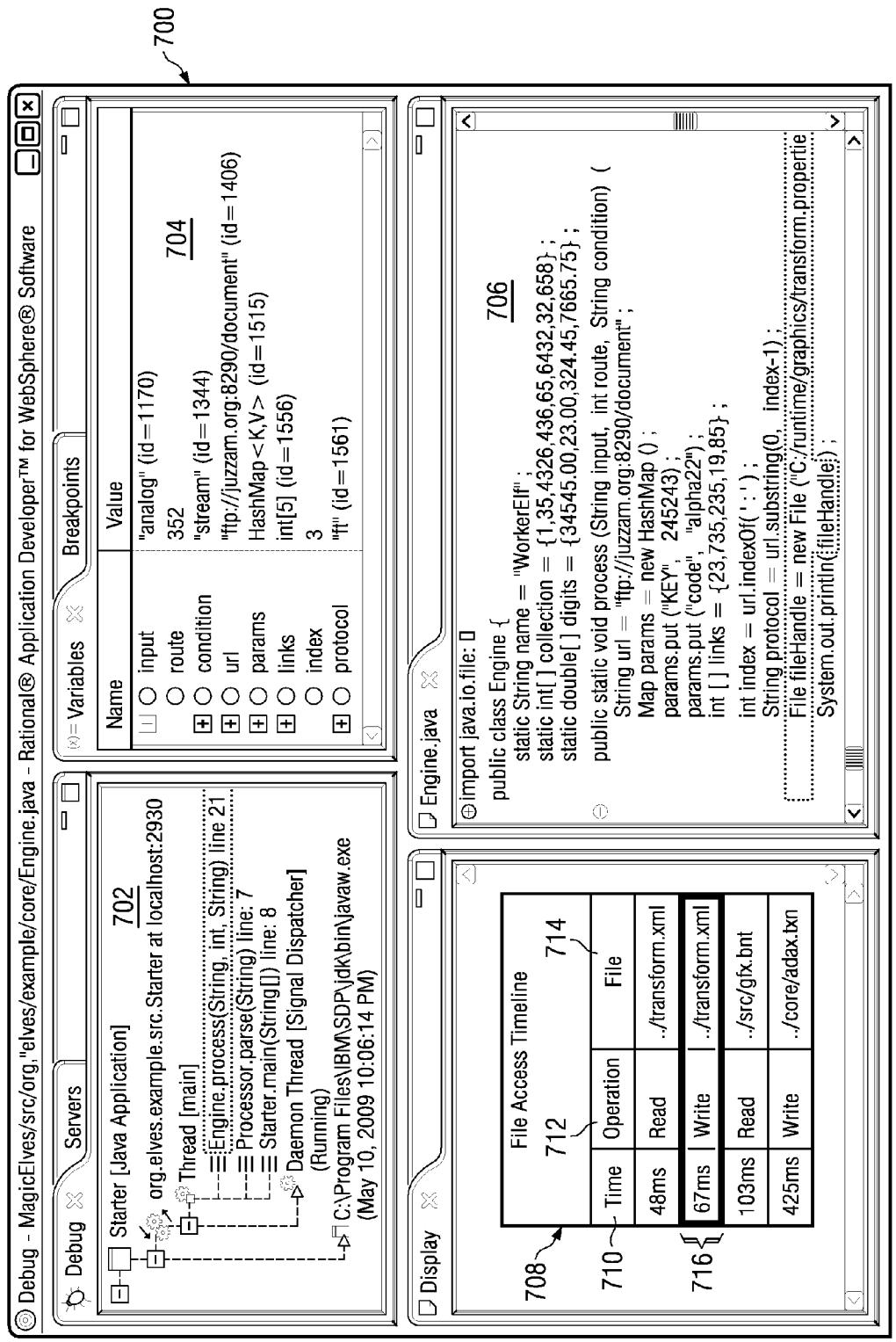
FIG. 7 is an exemplary debug interface illustrating file access-based debugging on a timeline in accordance with the illustrative embodiments.

FIG. 7 is an exemplary debug interface illustrating file access-based debugging on a timeline in accordance with the illustrative embodiments. Debug interface 700 is shown as comprising several views, including a debug view 702, a variables view 704, a progress view 706, and a file access timeline view 708. It should be noted that debug interface 700 is only meant as an example and not intended as a limitation on the different illustrative embodiments. In other words, debug interface 700 may include more or fewer views as necessary to accomplish processes of the different illustrative embodiments. Other views may include, but are not limited to, a breakpoint view, console view, expressions view, stack view, among others.

Debug view 702 allows a user to manage the debugging or running of a program. Debug view 702 comprises stack trace information for the suspended threads of each process being debugged. The threads are shown in debug view 702 as nodes in a tree, and the processes of a thread are displayed as child elements of the thread. A debug toolbar may be provided to offer standard debugging functionality, thereby enabling a user to pause, resume, kill, and disconnect processes as well as clear the view of any terminated processes. In addition, for any given line of code, the user may go into any given method or constructor (Step Into), execute the current line (Step Over), or leave the current execution point and return to the caller (Step Return). In this example, the Engine process is the selected process.

Variables view 704 allows a user to view the current variable values associated with the process selected in debug view 702. As a process is debugged, the debugger adds all variables declared within the scope of the process to variables view 704. Variables view 704 displays the object and local variables available at the current position in the execution stack.

Progress view 706 is used to display the JVM activity for the process currently selected in debug view 702. In addition to the currently executed code, progress view 706 also displays errors or breakpoints. In this example, the execution code for the Engine process selected in debug view 702 is displayed in progress view 706.

File access timeline view 708 is used to display all of the file access information for the process currently selected in debug view 702. In this example, file access timeline view 708 displays all of the file access activity performed by the process in chronological order. File access timeline view 708 is also shown to be presented in a table format, although the embodiments of the disclosure are not limited to such a format. File access timeline view 708 may also comprise a scrolling mechanism or other device to allow the user to scroll through the list of file access entries in the timeline.

In this example, file access timeline view 708 comprises time column 710, operation column 712, and file column 714. File access timeline view 708 may include more or fewer columns as necessary to accomplish processes of the different illustrative embodiments. Other columns may include, but are not limited to, file identifier, data read or written, process identifier for process that has accessed the file, and others. Time column 710 comprises time information at which a particular file access operation occurred, such as a time from the start of debugging the selected process (i.e., time 0). Operation column 712 specifies the file access activity (e.g., read, write, etc.) that occurred at a particular time. File column 714 indicates the file that was accessed by the process. Thus, event 716 provided in file access timeline view 708 indicates that the selected process performed a write operation on the . . . /transform.xml file at a time point of 67ms after the debugging of the selected process begun.

Prior to beginning the debugging of the selected process, the table in file access timeline view 708 may be empty. As the debugging process continues, the debugging facility may record each new file access activity for the selected process in the file activity log. For each new file access recorded in the file activity log, the debugging facility dynamically creates a new table event entry in file access timeline view 708. These new events may be appended to the table in a manner similar to a "tail" feature offered by many text editors.

A user may select an event in file access timeline view 708 to determine the status of the monitored accessed file. In existing debugging systems, breakpoints are used to control the execution of the process by having a user mark a selected line in the program code as a breakpoint. When a subsequent execution of the code reaches that line, the program code will stop at that point. The current status of the monitored process may be determined by the user from the values displayed in the other views in the interface. For example, the user may determine the current values for the process variables at the breakpoint from the information displayed variables view 704. Rather than using breakpoints in the execution of the process code to determine the status of the process, the file access timeline view 708 of the illustrative embodiments allows the user to stop the program code from executing at a point in the code that a particular file access event that the user has selected on the timeline occurs. The debugging facility allows the user to replay program execution and file access in a forward and backward manner, in contrast with existing breakpoints and debugging processes which only allow for observing program execution in a forward manner as the process executes. The debugging facility records all file accesses that occur during execution of the process and displays the file accesses in file access timeline view 708. The user may select a particular event in file access timeline view 708 based on the desired file, the desired operation (e.g., read or write activity) or the desired point in time in which a file access was performed by the process. Upon selecting a logged event in file access timeline view 708, the debugging facility may display the content of the file accessed by the monitored process at the logged point in time in the process execution.

Figure 8:
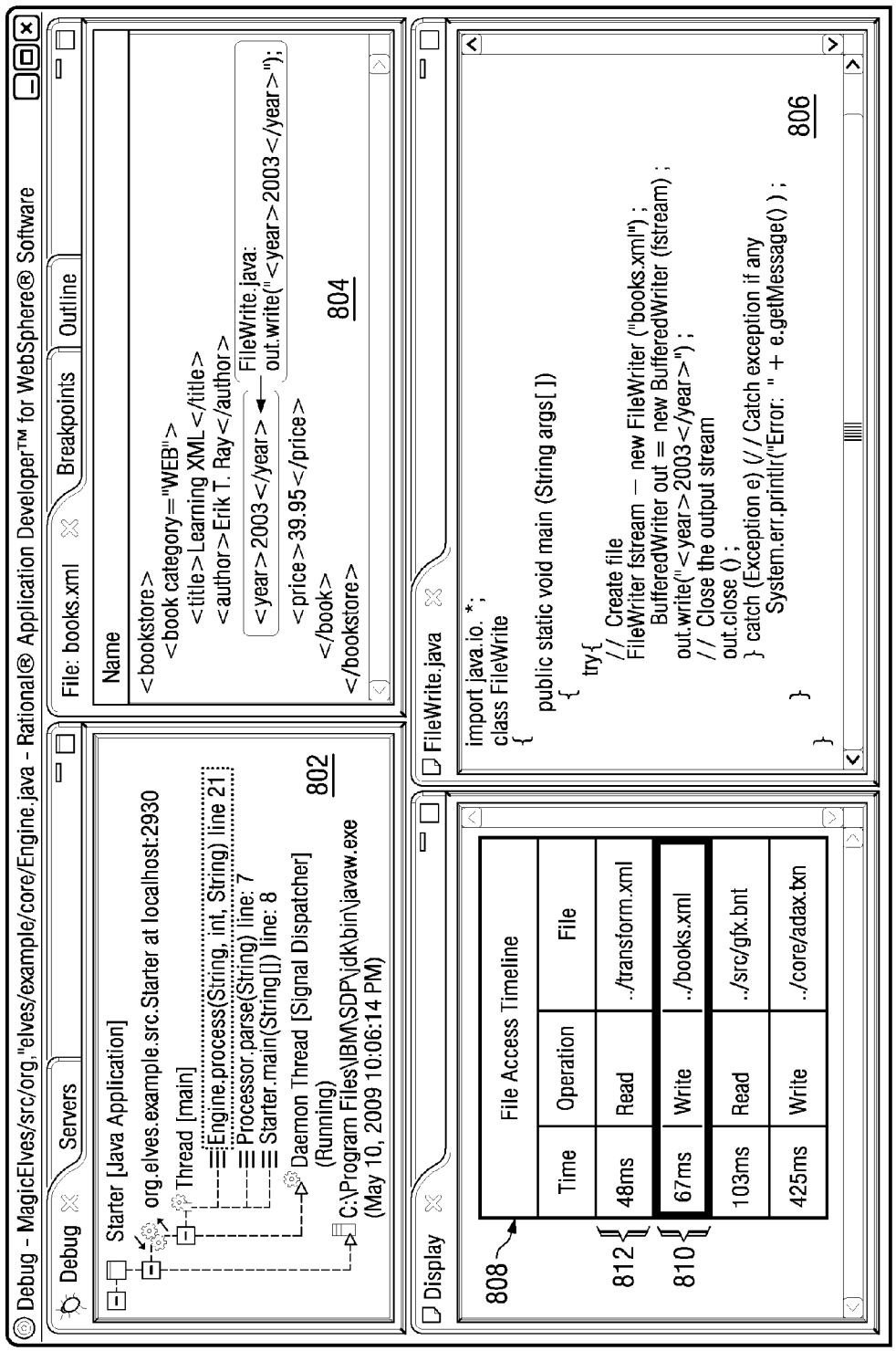
FIG. 8 is an exemplary debug interface illustrating file access-based debugging with DVR-like capabilities to view the state of a file accessed by a monitored process in accordance with the illustrative embodiments.

FIG. 8 is an exemplary debug interface illustrating file access-based debugging with DVR-like capabilities to view the state of a file accessed by a monitored process in accordance with the illustrative embodiments. Debug interface 800 is similar to debug interface 700 in FIG. 7 in that debug interface 800 is shown to include debug view 802, progress view 806, and file access timeline view 808. However, in this embodiment, debug interface 800 also comprises file view 804 which is used to display the current state of a file that is selected in file access timeline view 808. The state of a file in file view 804 at a particular point in time reflects the changes performed by the selected process on the file during the debugging process.

Debug view 802 is shown to have the Engine process selected for debugging, and the execution code for the Engine process selected is displayed in progress view 806. File access timeline view 808 displays all of the file access information for the process currently selected in debug view 802. The debugging facility records each file access by the monitored process and logs each access in the file activity log. The first time a file is accessed by the monitored process, the debugging facility takes an initial snapshot of the file's contents. As the monitored process executes, the debugging facility listens for and captures any changes of the file by the monitored process and records the changes in the file activity log, such that entries recorded for a file in the file activity log may comprise a revision history of the file.

When a user selects an event in file access timeline view 808 to determine the state of a file accessed by the monitored process (i.e., Engine) at a particular point in time, file view 804 is updated to display the file specified in the selected event. File view 804 may be updated by the debugging facility by first retrieving the initial content of the file selected in file access timeline view 808 from the file activity log. The initial content of the file is recorded by the debugging facility when the file is first accessed by the executing process. The debugging facility may then retrieve the content of the file as recorded in the file activity log at the point in time specified in the selected event in file access timeline view 808, as well as the file contents recorded for any intervening file accesses. The debugging facility may then determine the changes that occurred since the initial snapshot of the file was captured and apply these recorded changes to the file content shown in file view 804. For example, if the user selects event 810 in file access timeline view 808, the debugging facility obtains the content of the file as initially captured when the file was first accessed by the monitored process. The debugging facility then determines the changes in the file contents recorded for each subsequent file access/point in time, such as for event 812 and selected event 810 in file access timeline view 808. The debugging facility applies the changes to the initial file content and displays the updated file content in file view 804. Applying changes in this context may refer to a variety of actions. For example, in a scenario where forward debugging is being performed in a first run of the program, applying changes may refer to applying the changes the original file. In addition, changes to the file would be stored to the file access log to allow for playback and rewind of the file changes. The file being viewed in file view 804 is a snapshot of the original file, or a temp copy of the snapshot used for this debugging session. Applying the changes to the snapshot would refer to (1) visually displaying the changes made in file view 804, and (2) logging the changes, (3) and optionally saving the changes to the temp copy of the file being used for this debugging session. As the user selects different entries in file access timeline view 808, file view 804 is updated accordingly, each subsequent display re-creating the file at a particular point in time and showing changes made to the file content by the monitored process based on the particular event selected in file access timeline view 808.

File access timeline view 808 comprises DVR-like rewind and forward capabilities in that a user may select any of the entries in file access timeline view 808 in any order, thereby enabling a user to display the state of the file content in file view 804 for a particular point in time, 'rewind' the file content displayed in file view 804 to a prior point in time by selecting any earlier-occurring file access events in file access timeline view 808, and 'forward' the file content displayed in file view 804 to a later point in time by selecting any later-occurring file access events in file access timeline view 808. This DVR-like rewind and forward capability of the illustrative embodiments allows a user to selectively observe the state of a file accessed by the monitored process at any point in time, in contrast to existing breakpoint techniques which only allow a user to view values on the program execution stack such as variable values.

Figure 9:
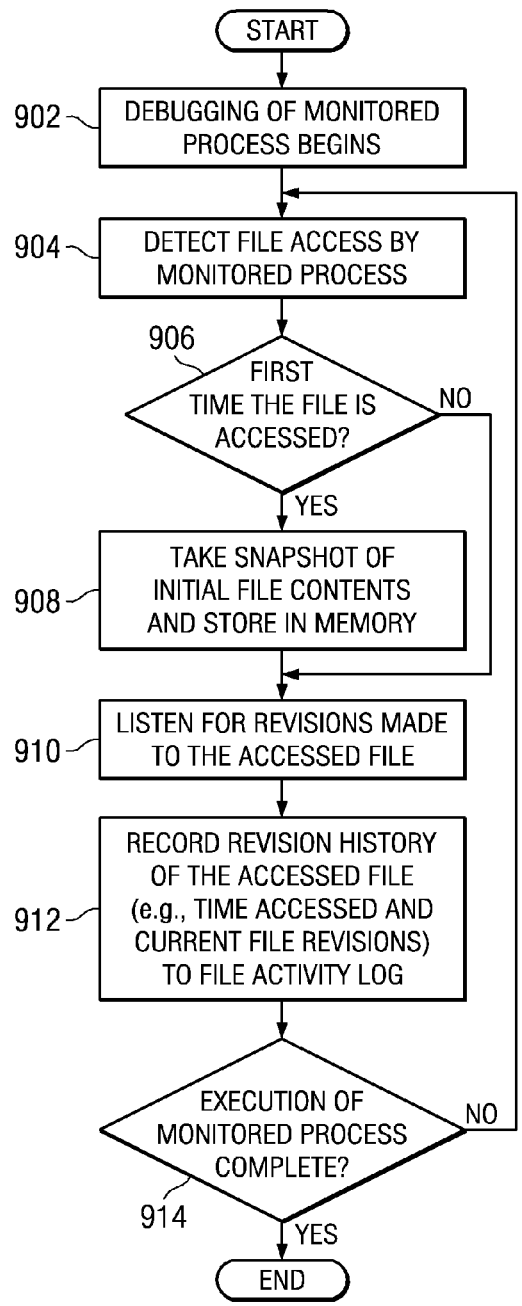
FIG. 9 is a flowchart of a process for monitoring file accesses of a process in accordance with the illustrative embodiments.

FIG. 9 is a flowchart of a process for monitoring file accesses of a process in accordance with the illustrative embodiments. The process described in FIG. 9 may be implemented in a debugging facility, such as debugging facility 600 in FIG. 6. The process begins with initiating the debugging of a monitored process by selecting the process in the debug view in the debug interface (step 902). During the execution of the monitored process, the monitored process may access one or more files. When the monitored process accesses a file (step 904), the debugging facility makes a determination as to whether this is the first time the file has been accessed by the monitored process (step 906). If the monitored process has previously accessed the file ('no' output of step 906), the process continues to step 910. However, if the monitored process has not previously accessed the file ('yes' output of step 906), the debugging facility captures and stores a snapshot of the initial contents of the accessed file in memory (step 908).

At step 910, the debugging facility listens for revisions that process makes to the accessed file. These revisions include changes to the initial content of the file. Any known technique for listening to file changes may be used, such as by comparing one version (i.e., the initial snapshot) of the file to another version to detect content differences. When a revision to the accessed file is detected, the debugging facility may record the entire revised file to the file activity log, or alternatively, record only the detected changes to the file activity log (step 912). The file activity log comprises the revision history for all of the files accessed by the process. Additional information may be stored with the initial content or a revision of the file, including the time the file was accessed and the type of the file access (e.g., read, write, etc.)

A determination is made by the debugging facility as to whether execution of the monitored process has completed (step 914). If the monitored process has completed ('yes' output of step 914), the process terminates thereafter. However, if the monitored process has not completed ('no' output of step 914), the process loops back to step 904 to continue monitoring the file accesses by the monitored process.

Figure 10:
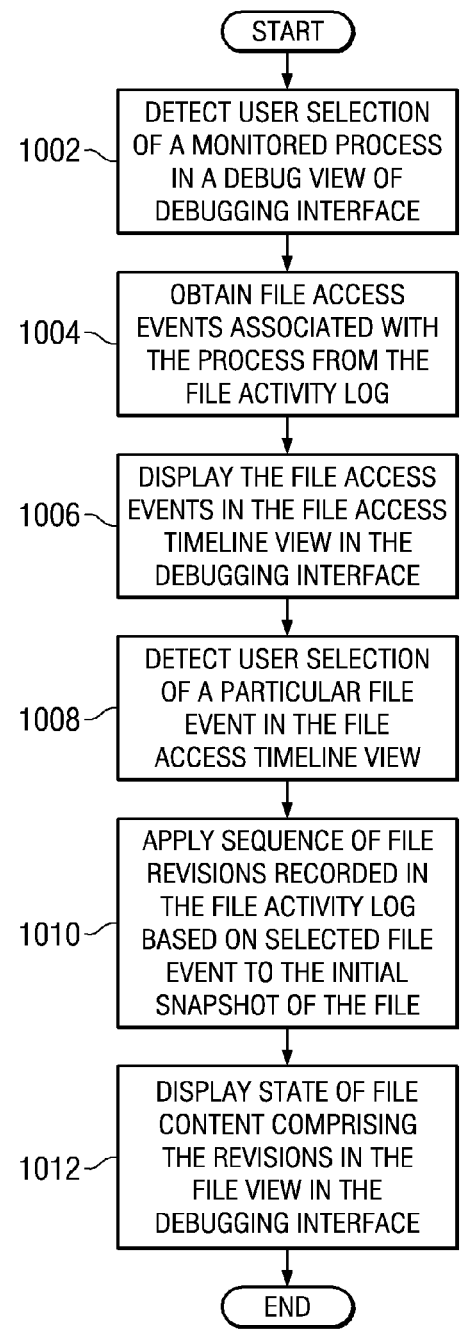
FIG. 10 is a flowchart of process for determining the state of a file accessed by a monitored process in accordance with the illustrative embodiments.

FIG. 10 is a flowchart of process for determining the state of a file accessed by a monitored process in accordance with the illustrative embodiments. The process described in FIG. 10 may be implemented in a debugging facility, such as debugging facility 600 in FIG. 6. The process begins with debugging facility detecting selection of a monitored process in a debugging facility interface by a user (step 1002). The debugging facility obtains the file access events that are associated with the selected process from the file activity log (step 1004). The file access events are then displayed in the file access timeline view in the debugging facility interface (step 1006).

When the debugging facility detects the selection of a particular file event in the file access timeline view by the user (step 1008), the debugging facility applies a sequence of file revisions recorded in the file activity log to the initial snapshot of the file (step 1010). The sequence of file revisions may include all of the changes recorded for each file event occurring after the initial snapshot up to the point in time specified in the selected file event in the file access timeline view. The file content comprising the revisions is then displayed in the file view of the debugging facility interface, thereby providing a snapshot of the state of the file at the point in time in the execution of the monitored process as selected from the file access timeline view, as well as a revision history for the file up to that point in time (step 1012). The revisions may be applied by identifying the changes that have been made to the file since the initial snapshot of the file and updating the file view to display the revisions to the initial file content.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the disclosure can take the form of a computer program product accessible from a computer readable medium providing program code for use by or in connection with a computer or any instruction execution system. For the purposes of this description, a computer readable medium can be any tangible apparatus that can contain, store, communicate, propagate, or transport the program for use by or in connection with the instruction execution system, apparatus, or device.

The disclosure can also take the form of a computer program product which has been downloaded over a network from one device to another for use in the other device. For instance, the program code stored in a computer readable storage medium in a server data processing system may be downloaded over a network from the server to a remote data processing system, such as a client or another server. Likewise, the program code stored in a computer readable storage medium in a client data processing system may be downloaded over a network from the client to a remote data processing system, such as a server or another client.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the embodiments of the disclosure has been presented for purposes of illustration and description, and is not intended to be exhaustive or limited to the disclosure in the form disclosed. Many modifications and variations will be apparent to those of ordinary skill in the art. The embodiment was chosen and described in order to best explain the principles of the disclosure, the practical application, and to enable others of ordinary skill in the art to understand the disclosure for various embodiments with various modifications as are suited to the particular use contemplated.

What is claimed is:

1. A computer implemented method for monitoring file accesses of a monitored process, the computer implemented method comprising:
    responsive to detecting selection of a monitored process in a first view in a debugging interface, obtaining, by a processing unit in a computer, file access information associated with the monitored process from a file activity log;
    displaying, by the processing unit, the file access information as selectable file access events in a second view of the debugging interface, wherein each file access event represents a read or write operation performed on a file at a particular point in time by the monitored process;
    responsive to detecting user selection of a file access event in the second view, retrieving, by the processing unit, an initial content of a file associated with the selected file access event from the file activity log;
    retrieving, by the processing unit, revisions made to the file by the monitored process within a defined period of time from the file activity log;
    applying, by the processing unit, the revisions made to the file within the period of time to the initial content of the file to form revised file content, wherein the revised file content comprises a state of the file at the particular point in time; and
    displaying, by the processing unit, the revised file content in a third view in the debugging interface, wherein the selectable file access events in the second view comprise all file access events performed by the monitored process.

2. The computer implemented method of claim 1, further comprising:
    repeating the retrieving, applying, and displaying each time a user selection of another file access event in the second view is detected.

3. The computer implemented method of claim 2, wherein the another file access event is a file access event that occurred at a later point in time than the previously selected file access event.

4. The computer implemented method of claim 2, wherein the another file access event is a file access event that occurred at an earlier point in time than the previously selected file access event.

5. The computer implemented method of claim 1, wherein the defined period of time comprises a point in time where execution of the monitored process begins to the particular point in time of the file access event.

6. The computer implemented method of claim 1, further comprising:
    detecting that the monitored process accesses the file;

recording an initial content of the file in the file activity log if the monitored process has previously accessed the file;

monitoring for and recording each read or write operation and changes made by the read or write operation performed on the file by the monitored process in the file activity log.

7. The computer implemented method of claim 6, wherein recording each read or write operation further comprises recording a path of the file, a point in time the file was accessed by the monitored process, a file access type, and changes to the initial content of the file at the point in time.

8. A computer program product for monitoring file accesses of a monitored process, the computer program product comprising:

a tangible computer recordable storage device having computer executable program code stored thereon, the computer executable program code for execution by a computer, comprising:

computer executable program code for obtaining, in response to detecting selection of a monitored process in a first view in a debugging interface, obtaining file access information associated with the monitored process from a file activity log;

computer executable program code for displaying the file access information as selectable file access events in a second view of the debugging interface, wherein each file access event represents a read or write operation performed on a file at a particular point in time by the monitored process;

computer executable program code for retrieving, in response to detecting user selection of a file access event in the second view, an initial content of a file associated with the selected file access event from the file activity log;

computer executable program code for retrieving revisions made to the file by the monitored process within a defined period of time from the file activity log;

computer executable program code for applying the revisions made to the file within the period of time to the initial content of the file to form revised file content, wherein the revised file content comprises a state of the file at the particular point in time; and computer executable program code for displaying the revised file content in a third view in the debugging interface, wherein the selectable file access events in the second view comprise all file access events performed by the monitored process.

9. The computer program product of claim 8, further comprising:

computer executable program code for repeating the retrieving, applying, and displaying each time a user selection of another file access event in the second view is detected.

10. The computer program product of claim 9, wherein the another file access event is a file access event that occurred at a later point in time than the previously selected file access event.

11. The computer program product of claim 9, wherein the another file access event is a file access event that occurred at an earlier point in time than the previously selected file access event.

12. The computer program product of claim 8, wherein the defined period of time comprises a point in time where execution of the monitored process begins to the particular point in time of the file access event.

13. The computer program product of claim 8, further comprising:

computer executable program code for detecting that the monitored process accesses the file;

computer executable program code for recording an initial content of the file in the file activity log if the monitored process has previously accessed the file;

computer executable program code for monitoring for and recording each read or write operation and changes made by the read or write operation performed on the file by the monitored process in the file activity log.

14. The computer program product of claim 13, wherein the computer executable program code for recording each read or write operation further comprises recording a path of the file, a point in time the file was accessed by the monitored process, a file access type, and changes to the initial content of the file at the point in time.

15. The computer program product of claim 8, wherein the computer executable program code is stored in a computer readable storage medium in a data processing system, and wherein the computer executable program code is downloaded over a network from a remote data processing system.

16. The computer program product of claim 8, wherein the computer executable program code is stored in a computer readable storage medium in a server data processing system, and wherein the computer executable program code is downloaded over a network from a remote data processing system for use in a computer readable storage medium with the remote system.

17. An apparatus, comprising:

a bus;

a storage device connected to the bus, wherein the storage device contains computer executable code;

at least one managed device connected to the bus;

a communications unit connected to the bus; and a processing unit connected to the bus, wherein the processing unit executes the computer executable code to obtain, in response to detecting selection of a monitored process in a first view in a debugging interface, file access information associated with the monitored process from a file activity log; display the file access information as selectable file access events in a second view of the debugging interface, wherein each file access event represents a read or write operation performed on a file at a particular point in time by the monitored process; retrieve, in response to detecting user selection of a file access event in the second view, an initial content of a file associated with the selected file access event from the file activity log; retrieve revisions made to the file by the monitored process within a defined period of time from the file activity log; apply the revisions made to the file within the period of time to the initial content of the file to form revised file content, wherein the revised file content comprises a state of the file at the particular point in time; and display the revised file content in a third view in the debugging interface, wherein the selectable file access events in the second view comprise all file access events performed by the monitored process.

18. The apparatus of claim 17, wherein the processing unit further executes the computer executable code to repeat the retrieving, applying, and displaying each time a user selection of another file access event in the second view is detected.

* * * * *